United States Patent [19]

Kosugi et al.

[11] Patent Number: 5,867,664
[45] Date of Patent: Feb. 2, 1999

[54] TRANSFERRING MESSAGES IN A PARALLEL PROCESSING SYSTEM USING RECEPTION BUFFERS ADDRESSED BY POOL PAGES IN A VIRTUAL SPACE

[75] Inventors: Hidenori Kosugi, Hatano; Patrick Hamilton, Machida, both of Japan

[73] Assignee: Hitachi, Ltd., Tokyo, Japan

[21] Appl. No.: 766,897

[22] Filed: Dec. 13, 1996

[30] Foreign Application Priority Data

Dec. 15, 1995 [JP] Japan .................................... 7-327264

[51] Int. Cl.[6] .................................................. G06F 15/164
[52] U.S. Cl. ............................... 395/200.64; 395/200.75; 395/876
[58] Field of Search .......................... 395/200.64, 200.75, 395/876; 711/103, 209

[56] References Cited

U.S. PATENT DOCUMENTS

| | | | |
|---|---|---|---|
| 5,237,661 | 8/1993 | Kawamura et al. | 395/250 |
| 5,440,691 | 8/1995 | Carrafiello | 395/250 |
| 5,629,928 | 5/1997 | Calvignac et al. | 370/237 |
| 5,634,127 | 5/1997 | Cloud et al. | 395/680 |
| 5,781,801 | 7/1998 | Flanagan et al. | 395/876 |

*Primary Examiner*—Lance Leonard Barry, Esq.
*Attorney, Agent, or Firm*—Antonelli, Terry, Stout & Kraus, LLP

[57] ABSTRACT

In a parallel processor system, a plurality of nodes each comprising a processor and a main storage unit are interconnected through a network, wherein a user process is executed under the control of an operating system in each of the nodes and inter-process communications are performed through the network for transmitting and receiving messages among the nodes. Reception buffers are provided in a main storage unit and addressed by pool pages, which are discontinuous in a logical address domain or in a real address domain, in a virtual space used by the user process executed by each node. Additionally, reception buffer control information is located on the main storage unit for managing the reception buffers. A node, when receiving a message, uses communication information included in the received message and reception buffer control information to calculate a real address in the reception buffers for storing the received message.

17 Claims, 11 Drawing Sheets

TRANSFERRING MESSAGES IN A PARALLEL PROCESSING SYSTEM USING RECEPTION BUFFERS ADDRESSED BY POOL PAGES IN A VIRTUAL SPACE

BACKGROUND OF THE INVENTION

The present invention relates to a message reception method and a message communication system, and more particularly to a message reception method and a message communication system suitable for use in a parallel processor system for transferring messages.

Conventionally, for making inter-process communications in a parallel processor system comprising a plurality of nodes each including a plurality of processors, a transmission node copies data to be transmitted from a user space to a kernel space, while a reception node copies data received from the kernel space to a user space. This inter-process communication always requires the intervention of an operating system (OS) for transferring a message. For this reason, overhead occurs due to the copy of data into a buffer. As a method for solving the problem of overhead, a remote memory transfer method is known, for example, as described in JP-A-6-19856. In this remote memory transfer method, an operating system has a communication region having a continuous real address range reside in a memory. In this way, direct data transfer can be carried out between the communication regions of a transmission process and a reception process, thus removing the overhead due to the copy of data into a buffer.

SUMMARY OF THE INVENTION

The remote memory transfer method is optimal for large scale computing applications or the like in order for processes in different nodes to efficiently transfer a large amount of data at a time in synchronism with each other. However, ordinary applications generally require an asynchronous communication method. For the asynchronous communication method, a communication library (a library for allowing a message to pass from a transmission node to a reception node) is provided to form transmission and reception buffers such that the remote memory transfer method is utilized between the buffers. The transmission and reception buffers must have a region comprising fixed pages in which real addresses are continuous. For this reason, when this transfer method is employed between the transmission and reception buffers provided by the communication libraries, a reception process must produce a large amount of regions comprising fixed pages with continuous real addresses if a plurality of processes transfer a large amount of messages each having a size of several kilo bytes at a time. This would result in memory management overhead (memory compaction or the like), which may introduce degradation in the system performance.

It is an object of the present invention to provide a message reception method and a message communication system for use in a data transfer performed between a transmission process and a reception process without intervention of an operating system, which is capable of minimizing memory management overhead in the reception process to efficiently utilize a memory, even when a plurality of processes transfer a large amount of messages, each having a size of several kilobytes or less, to the reception process at a time.

To achieve the above object, the present invention provides a parallel processor system comprising a plurality of nodes and a network for interconnecting the plurality of nodes, each of the nodes including a processor and a main storage unit, wherein a user process is executed in each of the nodes under the control of an operating system to perform inter-process communications among the respective nodes through the network to transmit and receive messages. In each of the nodes, reception buffers are provided in a main storage region of the main storage unit. The reception buffers are addressed by pool pages in a virtual space used by the user process executed in the node, where the pool pages are not continuous on a logical address domain or on a real address domain. Also, reception buffer control information is located in the main storage region for managing the reception buffers. A node receiving a message uses communication information included in the received message and the reception buffer control information to calculate a real address in a region in which the received message is to be stored in the reception buffers.

According to the present invention, a real address region with fixed pages is not required for providing the reception buffers. Thus, even if a plurality of user processes transfer a large amount of messages each having a size of several kilobytes or less in a communication event, memory management overhead is limited to a minimum in the reception process, thus preventing the system performance from degrading. In addition, a storage region can be effectively utilized.

DESCRIPTION OF THE PREFERRED EMBODIMENTS

A message reception method according to a first embodiment of the present invention will hereinafter be described with reference to FIGS. 1 through 10.

Figure 1:
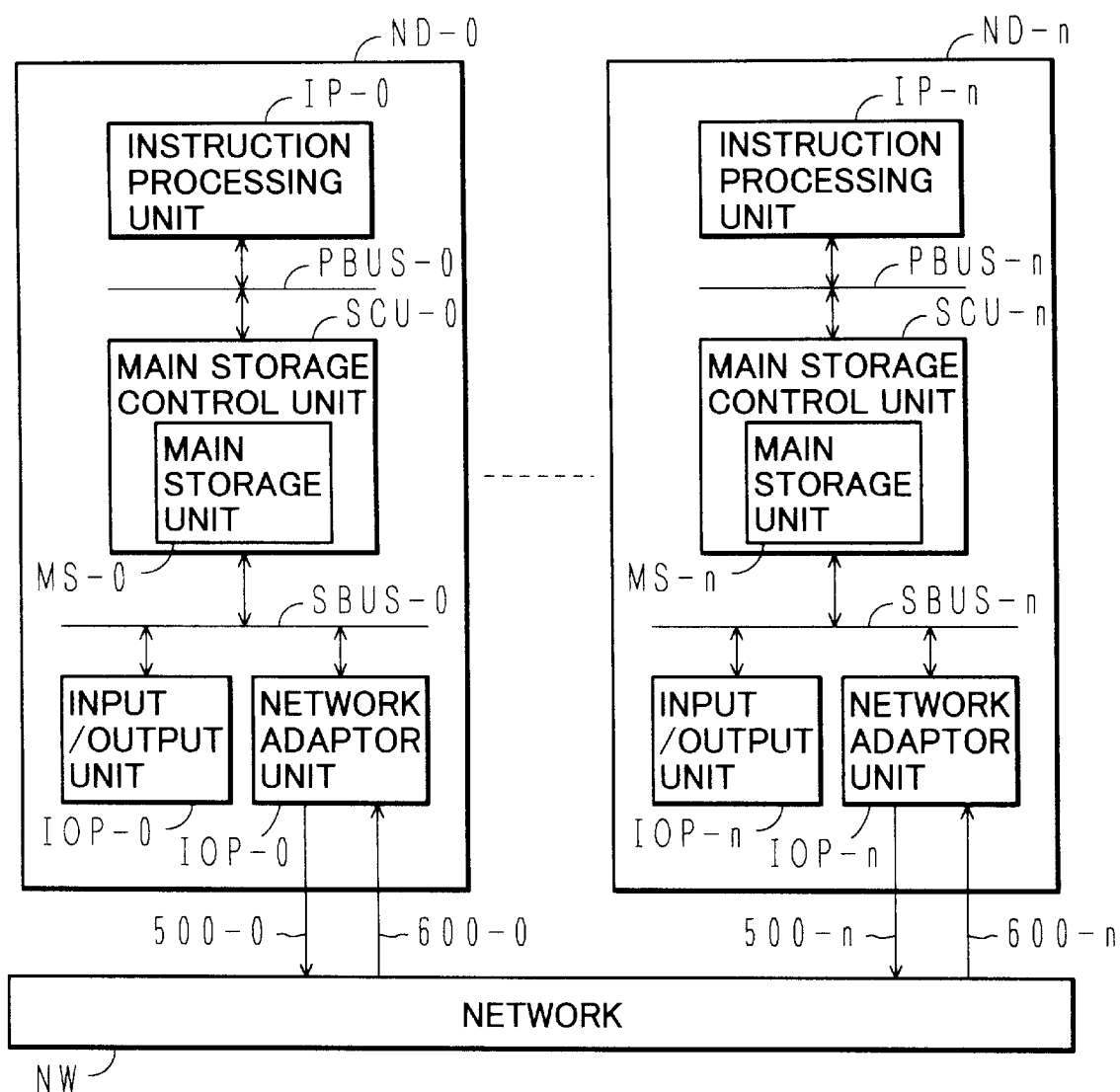
FIG. 1 is a block diagram illustrating the configuration of a parallel processor system in a first embodiment of the present invention.

FIG. 1 illustrates the configuration of a parallel processor system in the first embodiment of the present invention.

n+1 nodes ND-0, ND-1, . . . , ND-n are coupled to each other through a network NW. The node ND-0 comprises an instruction processing unit IP-0, a main storage unit MS-0, a main storage control unit SCU-0 for controlling the main storage unit MS-0, an input/output unit IOP-0, and a network adaptor unit ADP-0. The instruction processing unit IP-0 and the main storage control unit SCU-0 are coupled to each other through a processor bus PBUS-0. The main storage control unit SCU-0, the input/output unit IOP-0, and the network adaptor unit ADP-0 are coupled to each other through a system bus SBUS-0. The network adaptor ADP-0 transfer messages to other nodes ND-1, . . . , ND-n from a transmission signal line 500-0 through the network NW. On the contrary, messages from other nodes ND-1, . . . , ND-n are received at the network adaptor unit ADP-0 through the network NW an a reception signal line 600-0.

The other nodes ND-1, . . . , ND-n have the same configuration as the node ND-0. For example, the node ND-n comprises an instruction processing unit IP-n, a main storage unit MS-n, a main storage control unit SCU-n for controlling the main storage unit MS-n, an input/output unit IOP-n, and a network adaptor unit ADP-n. The instruction processing unit IP-n and the main storage control unit SCU-n are coupled to each other through a processor bus PBUS-n. The main storage control unit SCU-n, the input/output unit IOP-n, and the network adaptor unit ADP-n are coupled to each other through a system bus SBUS-n.

Each of the nodes ND-0, . . . , ND-n is provided with a communication library which runs in a user space. A user process calls a function in the communication library to perform an inter-process communication with a process in any other node ND-0, . . . , ND-n through the network NW. Reception control information used in the inter-process communication is introduced into the main storage unit MS by the communication library.

Figure 2:
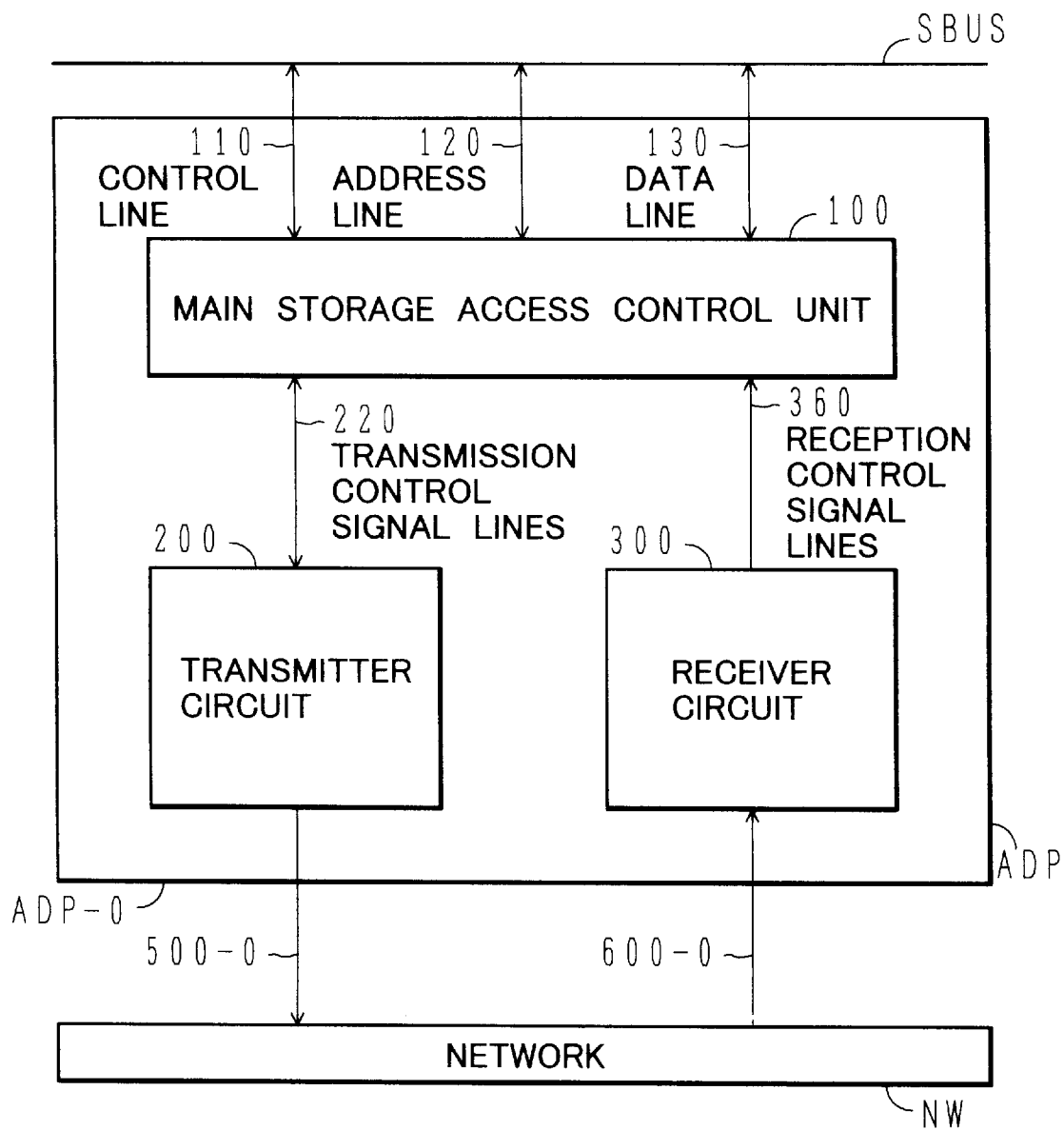
FIG. 2 is a block diagram illustrating the configuration of a network adapter unit in the parallel processor system.

Next, the configuration of the network adaptor unit ADP in each node ND will be described with reference to FIG. 2.

The network adaptor unit ADP comprises a transmitter circuit 200 for transmitting a message to the network NW, a receiver circuit 300 for receiving a message from the network NW, and a main storage access circuit 100 for controlling an access to the main storage control unit SCU.

The receiver circuit 300 receives a message from the network NW through a reception signal line 600. The message received through the reception signal line 600 is once stored in the receiver circuit 300. Then, in accordance with the contents of a message header contained in the message, the message is fetched into the main storage access circuit 100 through reception control signal lines 360. The structure of the message will be described later with reference to FIG. 5. The main storage access circuit 100 is coupled to the system bus SBUS through a control line 110, an address line 120, and a data line 130. A message fetched in the main storage access circuit 100 is transferred from the main storage access circuit 100 to the main storage control unit SCU through the system bus SBUS.

A message to be transmitted from a node ND is read from the main storage unit MS, transferred to the main storage access circuit 100 through the main storage control unit SCU and the system bus SBUS, and further transferred to the transmitter circuit 200 through transmission control signal lines 220. The transmitter circuit 200 transmits the message to the network NW through a transmission signal line 500.

Next, the configuration of the receiver circuit 300 in the network adaptor unit ADP will be described with reference to FIG. 3.

The receiver circuit 300 comprises a reception control circuit 310 for controlling reception of a message, a reception buffer circuit 350 for buffering a message from the network NW, and a hash function circuit 320 for generating a hash function.

In data received from the network NW through the reception signal line 600, a message header is transferred to the reception control circuit 310, while message data is transferred to the reception buffer circuit 350.

The reception control circuit 310 sends an argument to the hash function circuit 320 through a hash argument signal line 321. The hash function circuit 320 generates a hash signal corresponding to the argument based on a hash method, and sends the generated hash signal to the reception control circuit 310 through a hash signal line 322.

The reception control signal lines 360 includes an address line 311, a byte number line 312, a main storage read request line 313, a main storage write request line 314, and a data line 315.

The reception control circuit 310 calculates a real address of the reception buffer circuit 350 based on a message header. A method of calculating a real address will be described later. The reception control circuit 310 sends data on the calculated real address to the main storage access circuit 100 through the data line 315. Also, the reception control circuit 310 sends a transfer start signal to the reception buffer circuit 350 through a transfer start signal line 317, and simultaneously sends a data length of data to be sent, to the reception buffer circuit 350 through a data length line 316. The reception buffer circuit 350, upon receiving these signals, transfers stored message data to the main memory access circuit 100 through a write data line 352. The reception buffer circuit 350, when completing the transfer, sends a transfer completion signal to the reception control circuit 310 through a transfer completion signal line 351.

Figure 4:
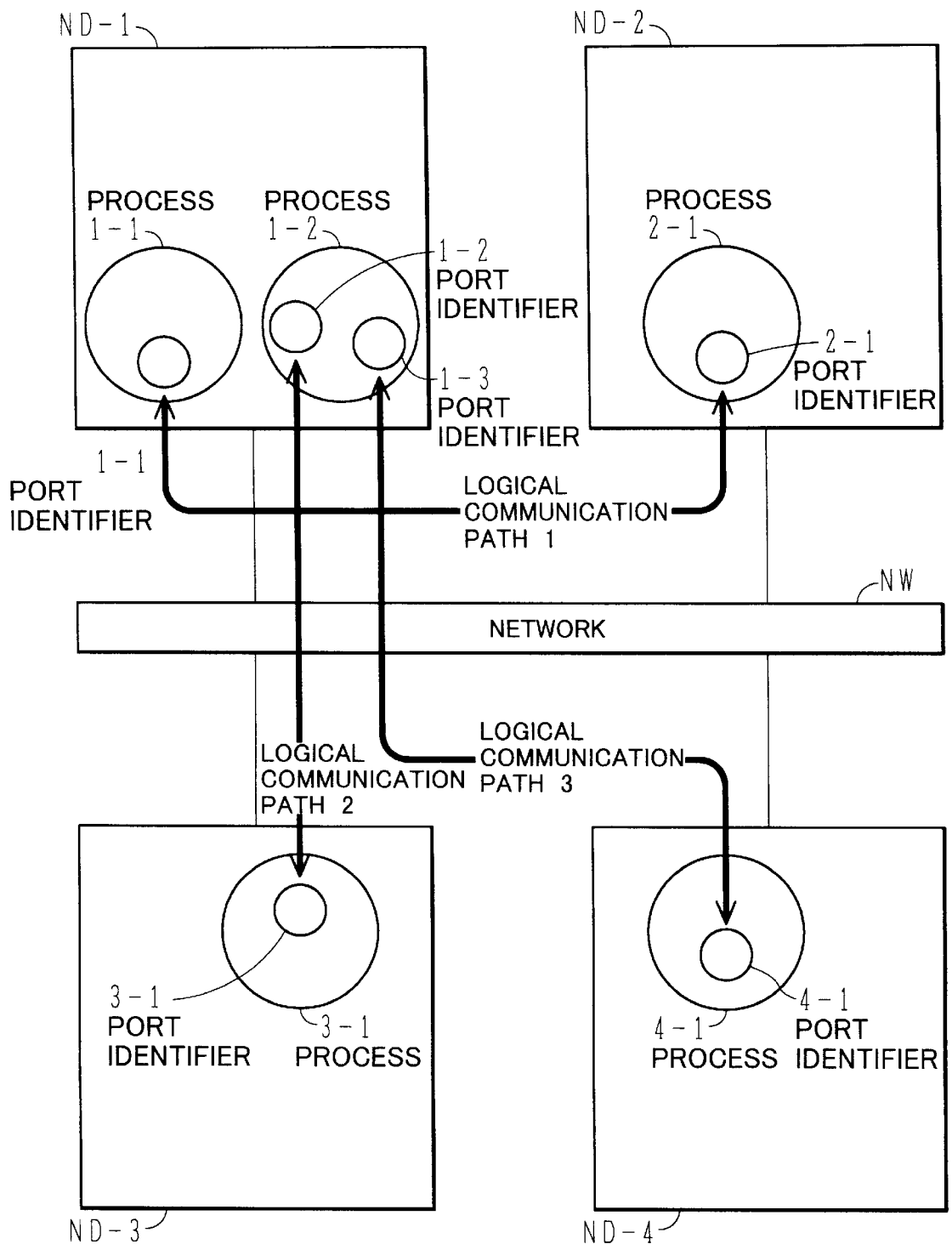
FIG. 4 is a schematic diagram conceptually illustrating logical message communication paths among nodes in the parallel processor system.

Next, logical message communication paths among nodes will be described with reference to FIG. 4.

Each logical message communication path is uniquely specified by a node number and a port identifier indicative of an end point of the communication path. More specifically, in FIG. 4, a node ND-1 has two processes 1-1, 1-2. The process 1-1 has a port identifier 1-1, while the process 1-2 has port identifiers 1-2, 1-3. A node ND-2 has a single process 2-1 which has a port identifier 2-1. A node ND-3 has a single process 3-1 which has a port identifier 3-1. A node ND-4 has a single process 4-1 which has a port identifier 4-1. It should be noted that the number of processes and the number of port identifiers possessed by each node ND are arbitrary and FIG. 4 merely illustrates an example of a possible configuration.

The nodes ND-1, ND-2, ND-3, ND-4 are mutually connected through the network NW, however, logically speaking, a message communication path is formed between particular port identifiers or end points indicated thereby. For example, a logical communication path (channel) 1 is formed between the port identifier 1-1 and the port identifier 2-1, as indicated by thick arrows. Similarly, a logical communication path 2 is formed between the port identifier 1-2 and the port identifier 3-1. Further, a logical communication path 3 is formed between the port identifier 1-3 and the port identifier 4-1. Thus, a source and a destination of a message can be specified by selecting a port identifier number of the source and a port identifier number of the destination.

Figure 5:
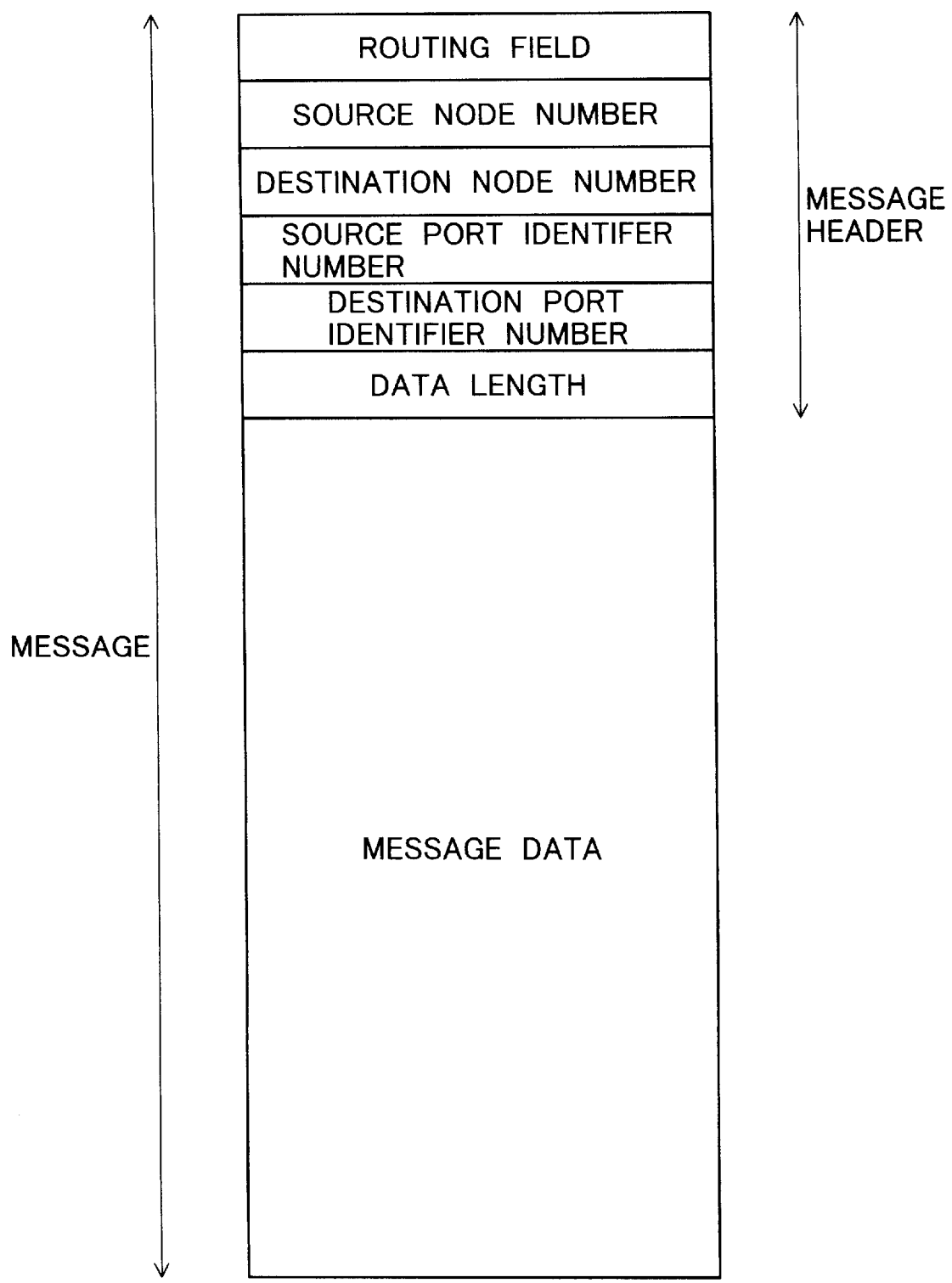
FIG. 5 is a diagram showing the structure of a message communicated between nodes.

Next, the structure of a message to be transferred will be explained with reference to FIG. 5.

A message 400 to be transferred consists of a message header and message data. The message header comprises a routing field used for network routing, a source node number, a destination node number, a source port identifier number, a destination port identifier number, and a data length.

For forming a logical message communication path described in connection with FIG. 4, a source port identifier number and a destination port identifier number are added to the message header in addition to the source node number and the destination node number. With the source port identifier number and the destination port identifier number specified in the message, the transfer of the message is facilitated.

Next, the structure of communication control information TCB located in a storage region of the main storage unit MS will be explained with reference to FIG. 6.

A plurality of communication control information blocks TCB-0, TCB-1, . . . , TCB-(N-1), TCB-N are located in the main storage unit MS in the respective nodes ND. Since a communication control information block TCB is provided for each port identifier, the number of located communication control information blocks TCBs is equal to the number of port identifiers. Specifically, if the node ND-1 has three port identifiers, three communication control information blocks TCBs are located in the main storage unit MS of the node ND-1. Here, the structure of the communication control information TCB will be explained referring further to FIG. 6. The communication control information TCB comprises reception buffer control information PCB, a reception buffer group POOL, and a reception control word group RCW. The reception buffer group POOL comprises a plurality of reception buffers POOL-1, POOL-2, . . . , POOL-(N-1), POOL-N. Each reception buffer POOL is addressed by a pool page number PPN, independent of a logical address page number and a real address page number, and an in-page offset. A feature of the present invention lies in the use of the reception buffers POOLs.

The reception buffer control information PCB comprises a pool page control word PCW and a pool page number conversion table group PTE. The pool page control word PCW will be described later in detail with reference to FIG. 8.

The pool page number conversion table group PTE includes a plurality of pool page number conversion tables PTE-1, PTE-2, . . . , PTE-(N-1), PTE-N, corresponding to the number of reception buffers POOLs. Each pool page number conversion table PTE is provided for converting a pool page number PPN to a real address number RPN.

The reception control word group RCW includes reception control words RCW-1, RCW-2, . . . , RCW-(N-1), RCW-N. The reception control word RCW will be described later in detail with reference to FIG. 9.

The reception buffer control information PCB and the reception control words RCWs are controlled by the communication library and the network adaptor unit ADP. Details on the control will be described later.

Next, a reception control information assembly located in a storage region of the main storage unit MS will be explained with reference to FIG. 7.

A plurality of reception control information assemblies are located in a storage region of the main storage unit MS in each node ND. Since a reception control information assembly is provided for each port identifier, the number of located reception control information assemblies is equal to the number of port identifiers. Specifically, if the node ND-1 has, for example, three port identifiers, three reception control information assemblies are located in the main storage unit MS of the node ND-1.

Here, the structure of the reception control information assembly will be explained referring further to FIG. 7. The reception control information assembly comprises a pool page control word (PCW) address, a reception control word (RCW) address data array, and a pool page number conversion table (PTE) address data array. The reception control word (RCW) address data includes an entry address and a pointer indicative of the location of the next reception control word RCW for each of reception control words RCW-1, RCW-2, . . . , RCW-(N-1), RCW-N. For example, the entry address of the reception control word RCW-1 is followed by a pointer indicative of the location of the reception control word RCW-2.

The pool page number conversion table (PTE) address data includes an entry address and a pointer indicative of the location of the next pool page number conversion table PTE for each of pool page number conversion tables PTE-1, PTE-2, . . . , PTE-(N-1), PTE-N. For example, the entry address of the pool page number conversion table PTE-1 is followed by a pointer indicative of the location of the pool page number conversion table PTE-2.

Figure 8:
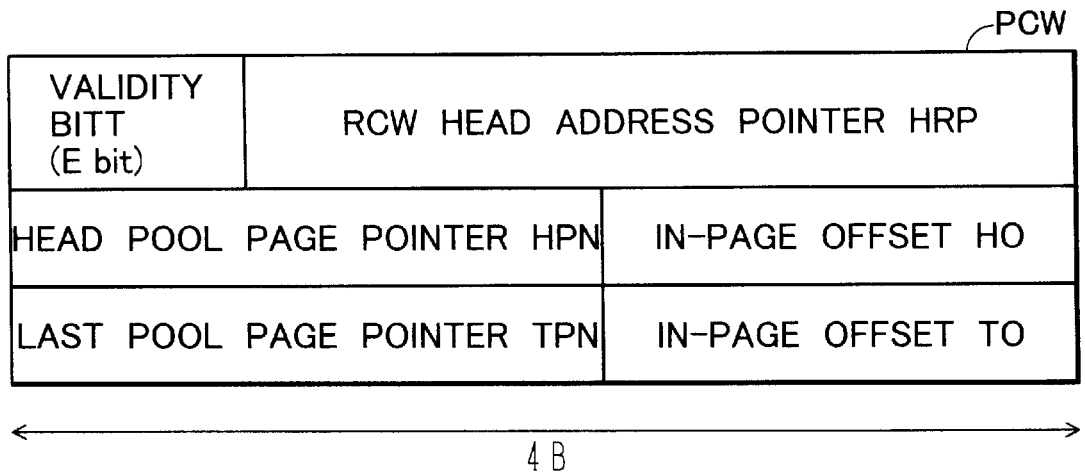
FIG. 8 is a diagram showing the structure of a pool page control word in the reception control information assembly.

Next, the structure of the pool page control word PCW shown in FIG. 6 will be explained with reference to FIG. 8.

The pool page control word PCW comprises an RCW head address pointer HRP which is a pointer indicative of the head address of a reception control word RCW; a validity bit Ebit indicative of whether or not the RCW head address pointer HRP is valid; a head pool page pointer HPN indicative of the head of an unused POOL page; an in-page offset HO of a head pool page; a last pool page pointer TPN indicative of the last page of an available reception buffer POOL; and an in-page offset TO of the last pool page.

Every time a message is received, the RCW head address pointer HRP which is a pointer indicative of the head address of a reception control word RCW, the validity bit Ebit indicative of whether or not the RCW head address pointer HRP is valid, the head pool page pointer HPN indicative of the head of an unused POOL page, and the in-page offset HO of a head pool page are updated by the network adaptor unit ADP.

Next, the structure of the reception control word RCW shown in FIG. 6 will be explained with reference to FIG. 9.

The reception control word RCW comprises a next reception control word RCW address pointer which is a pointer indicative of the address of a next reception control word RCW; a validity bit Ebit indicating whether or not this address pointer is valid; a pool page number of a reception buffer which has received a message; an in-page offset; a node number and a port identifier of a source which has transmitted a message; and a reception condition code indicating that a reception has been correctly terminated. A transfer completion bit is written into the reception control code when a reception has been correctly completed.

All data other than the next reception control word (RCW) address pointer and the validity bit are updated by the network adaptor unit ADP every time a message is received.

Figure 10:
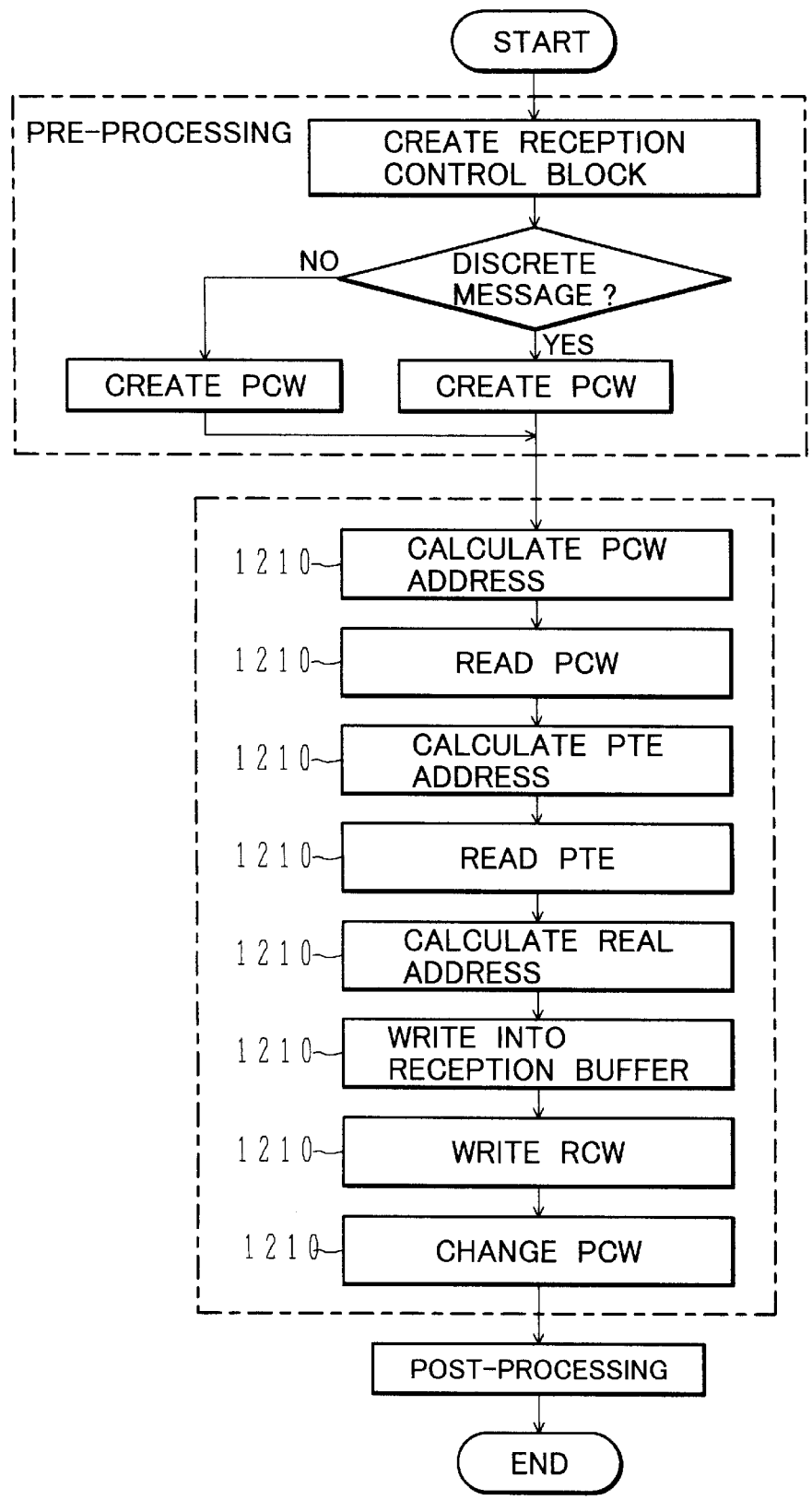
FIG. 10 is a flow chart for explaining a reception operation performed in a node.

Next, a reception operation performed by a node in the parallel processor system will be described with reference to FIG. 10.

1) Procedure 1100 (Pre-processing)

The procedure 1100 includes steps for pre-processing of the communication library, i.e., "create a reception control block" at step 1110; "determine a discrete message or continuous messages" at step 1120; "create a reception control word (for a discrete message)" at step 1130; and "create a reception control word (for continuous messages)" at step 1140.

2) Step 1110 (Create Reception Control Block)

Figure 6:
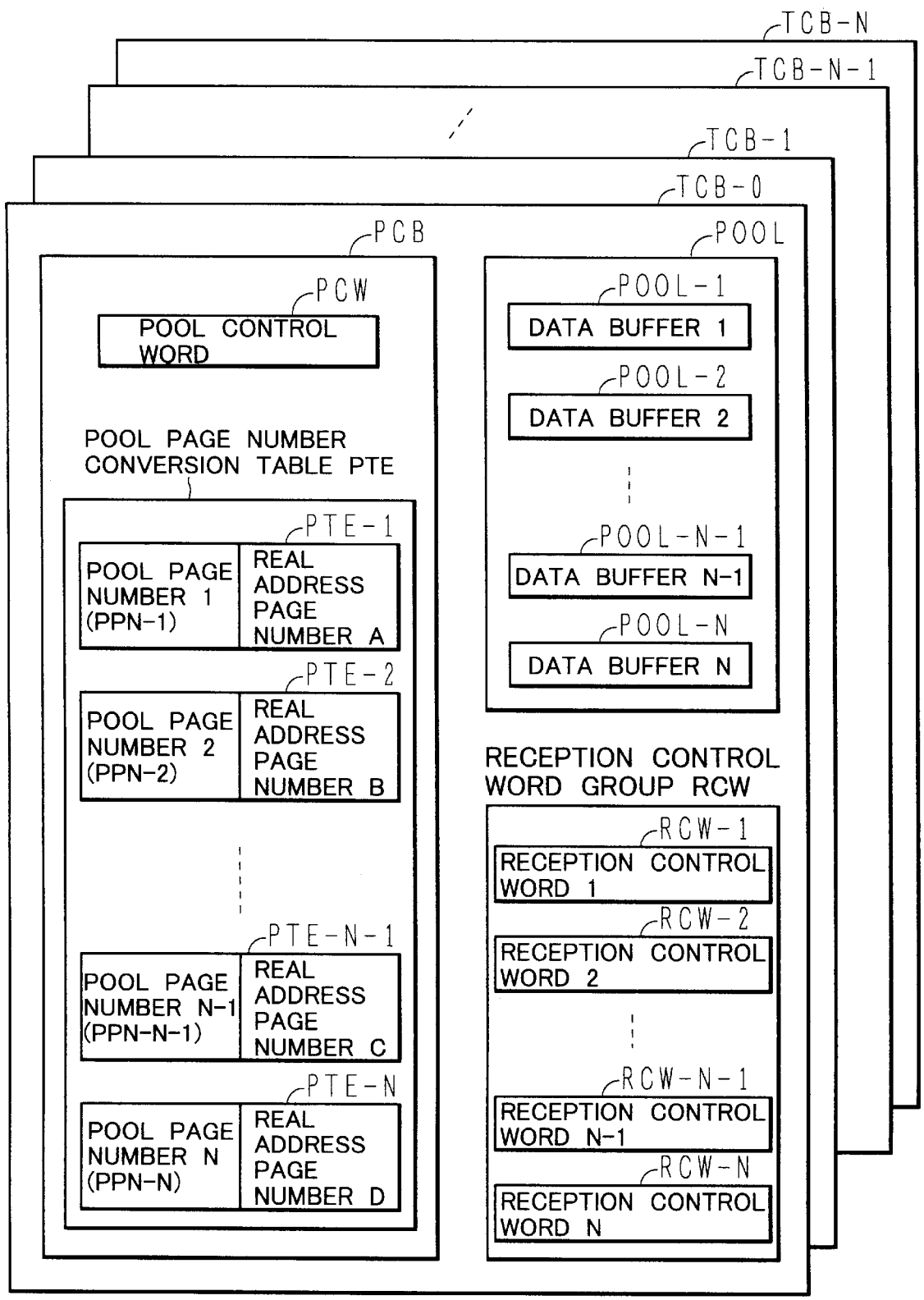
FIG. 6 is a diagram showing the structure of communication control information located on a storage region in a main storage unit.

At step 1110, the communication library in each node ND illustrated in FIG. 1 is executed by the instruction processing unit IP, and the communication control information block TCB shown in FIG. 6 is created in the main storage unit MS before starting the reception of a communicated message. As mentioned above, the communication control information block TCB is created for each port identifier of each process. For example, if the node ND-1 has three port identifiers 1-1, 1-2, 1-3, as illustrated in FIG. 4, three communication control information blocks TCBs are created in the main storage unit MS of the node ND-1.

First, the communication library creates reception buffer control information PCB and reception buffers POOL in the communication control information TCB in the main storage unit MS. Also, the communication library creates a reception control information assembly (FIG. 7) comprising a pool page control word (PCW) address, a reception control word (RCW) address array, and a pool page number conversion table (PTE) address array in the main storage unit MS.

In this event, the pool page control word (PCW) address and the pool page number conversion table (PTE) addresses in the PTE address array are created based on an algorithm of a hash function in the instruction processing unit IP. As an argument substituted into the hash function, a port identifier is used for the pool page control word (PCW) address, while a pool page number PPN and the port identifier are used for the respective pool page number conversion table (PTE) addresses.

3) Step 1120 (Determine Discrete Message or Continuous Messages)

At step 1120, a process executed by the instruction processing unit IP in each node ND calls an RECV function of the communication library. The called RECV function examines the pool page control word (PCW) address in the reception control information assembly created in the main storage unit MS at step 1110, and reads a pool page control word PCW from the communication control information TCB based on the pool page control word (PCW) address. Then, the validity bit Ebit in the read pool page control word PCW is examined to see whether it is on or off. If the validity bit Ebit is off, it is determined that a discrete message has been received. On the other hand, if the validity bit Ebit is on, it is determined that continuous messages have been received.

4) Step 1130 (Create PCW for Discrete Message)

When it is determined at step 1120 that the validity bit Ebit is off to indicate a discrete message, the procedure proceeds to step 1130.

Figure 7:
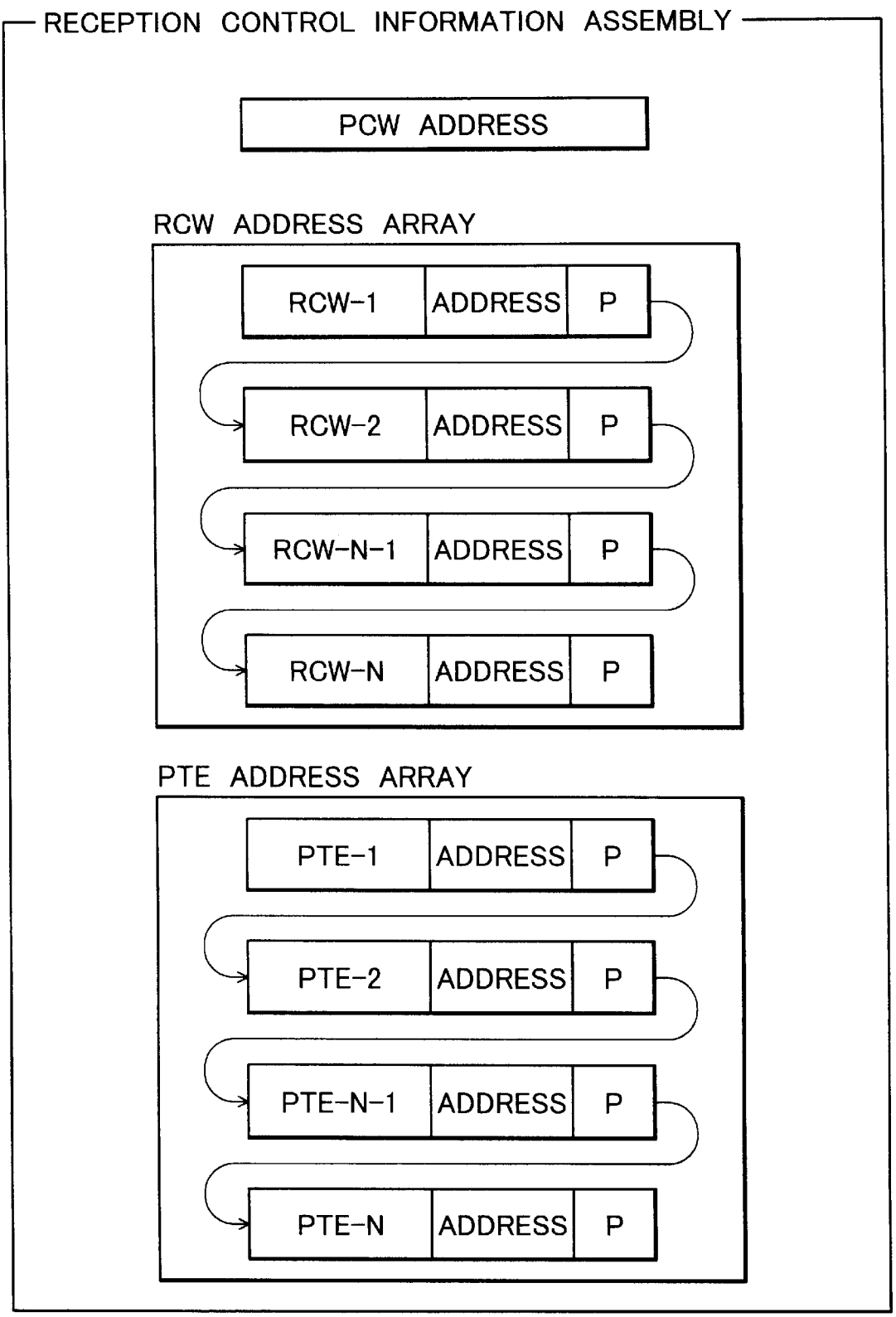
FIG. 7 is a diagram showing the structure of a reception control information assembly located on a storage region in the main storage unit.

At step 1130, the communication library writes the first reception control word (RCW) address (the address of a reception control word RCW-1) in the reception control word (RCW) address array of the reception control information assembly, shown in FIG. 7, into the RCW head address pointer HRP in the pool page control word PCW. Additionally, the validity bit Ebit is turned on at the same time the reception control word (RCW) address is written, to validate the RCW head address pointer HRP.

Figure 9:
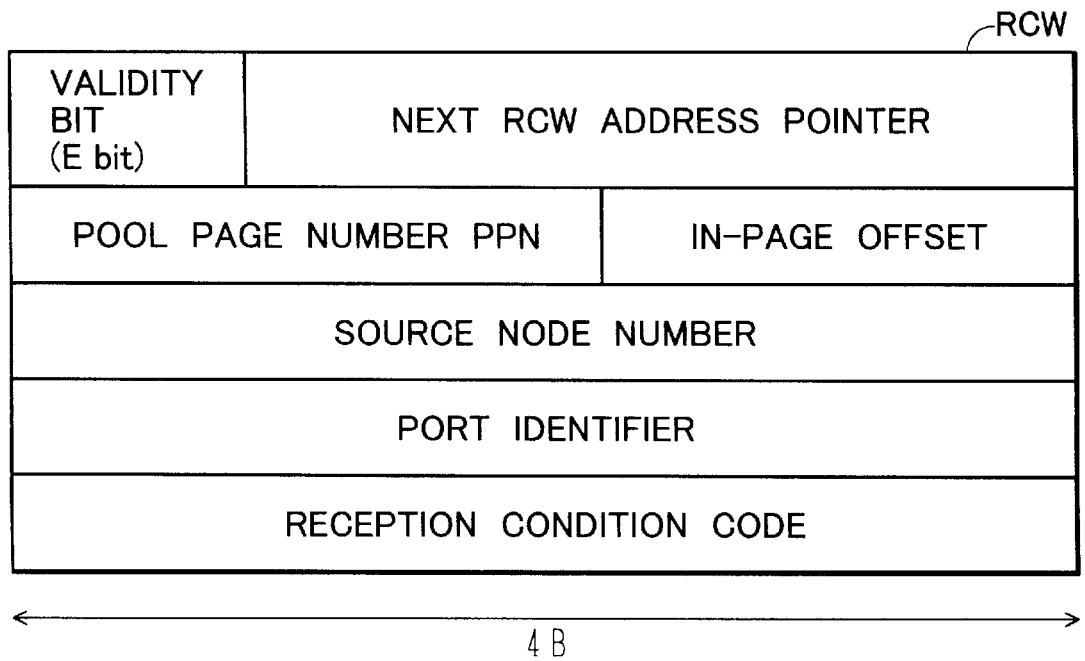
FIG. 9 is a diagram showing the structure of a reception control word in the communication control information.

Next, the reception control word RCW shown in FIG. 9 is created in a region specified by the written received control word (RCW) address. In this event, the second reception control word (RCW) address (the address of a reception control word RCW-2) in the reception control information assembly is written into the next reception control word (RCW) address pointer. The validity bit Ebit indicating that the pointer is valid is turned off to record that the message is discrete.

5) Step 1140 (Create PCW for Continuous Messages)

When it is determined at step 1120 that the validity bit Ebit is on, i.e., that continuous messages have been received, the procedure proceeds to step 1140.

At step 1140, when the validity bit Ebit is on, this means that chained reception control words RCWs have been formed. The communication library reads the head address of a reception control word RCW from the RCW head address pointer HRP in the pool page control word PCW. Then, the communication library reads the reception control word RCW based on the read address, retrieves the next reception control word (RCW) address from the next reception control word (RCW) address pointer in the read reception control word RCW, and reads the next reception control word RCW based on this next reception control word (RCW) address.

More specifically, written in the RCW head address pointer HRP in the pool page control word PCW (FIG. 8) is the address of the first reception control word RCW-1 in the reception control word (RCW) group shown in FIG. 6. When the reception control word RCW-1 is read based on this address, the address of the second reception control word RCW has been written in the next reception control word (RCW) address pointer of the reception control word RCW-1. Thus, the reception control word RCW-2 is read based on this address.

The communication library examines the validity bit Ebit in the read reception control word RCW (for example, the reception control word RCW-2). If the validity bit Ebit is off, it means that the read reception control word RCW is the last reception control word RCW, so that the address of this reception control word RCW (for example, the address of the reception control word RCW-2) is written into the RCW head address pointer HRP in the pool page control word PCW. Additionally, the validity bit Ebit is turned on at the same time the address is written, to validate the RCW head address pointer HRP.

Next, the reception control word RCW is created in a region specified by the reception control word (RCW) address. In this event, the third reception control word (RCW) address (corresponding to the address of the reception control word RCW-3) in the reception control information assembly shown in FIG. 7 is written into the next reception control word (RCW) address pointer.

When the validity bit Ebit in a read reception control word RCW (for example, the reception control word RCW-2) is on, the reception control word RCW is in use. Thus, the communication library reads the next reception control word RCW with reference to the next reception control word (RCW) address pointer in the reception control word RCW to check the validity bit Ebit in the next reception control word RCW. This operation is repeated until the communication library finds a reception control word RCW with the validity bit Ebit set in an off state. The subsequent processing is the same as described above.

6) Procedure 1200 (ADP Reception Operation)

The procedure 1200 includes steps for the "ADP reception operation), i.e., "calculate a PCW address" at step 1210; "read PCW" at step 1220; "calculate a PTE address" at step 1230; "read PTE" at step 1240; "calculate a real address" at step 1250;, "write into a reception buffer" at step 1260; "write a reception control word RCW" at step 1270; and "change PCW (removal from a chain)" at sep 1280.

7) Step 1210 (Calculate PCW address)

At step 1210, the network adaptor unit ADP, when receiving a message from the network NW, transfers the message to the receiver circuit 300. In the receiver circuit 300, a message header in the received message is transferred to the reception control circuit 310, while message data in the received message is transferred to the reception buffer circuit 350.

The reception control circuit 310, when receiving the message header, extracts a destination port identifier number from the message header, and sends the destination port identifier number as an argument to the hash function circuit 320 through the hash argument line 321. The hash function circuit 320 calculates a pool page control word (PCW) address in accordance with a hash method based on the argument. The calculated pool page control word (PCW) address is sent to the reception control circuit 310 through the hash signal line 322.

8) Step 1220 (Read PCW)

At step 1220, the reception control circuit 310 outputs the pool page control word (PCW) address calculated by the hash function circuit 320 to the main storage access circuit 100 through the address line 311. Additionally, the reception control circuit 310 outputs a requested number of bytes, based on a data length in the message header in the received message, to the main storage access circuit 100 through the byte number line 312. Further, the reception control circuit 310 outputs a main storage access request to the main storage access circuit 100 through the main storage read access line 313.

The main storage access circuit 100 reads a pool page control word PCW from the main storage unit MS through the system bus SBUS based on the pool page control word (PCW) address and the requested number of bytes sent thereto from the reception control circuit 310. Then, the read pool page control word PCW is transferred to the reception control circuit 310 through the data line 315.

9) Step 1230 (Calculate PTE address)

At step 1230, the reception control circuit 310 examines the validity bit Ebit in the pool page control word PCW sent thereto from the main storage access circuit 100. As has been explained in connection with step 1120, the RCW head address pointer HRP in the pool page control word PCW contains the address of the first reception control word RCW, and the validity bit Ebit, indicating whether or not the RCW head address pointer HRP is valid or not is on, so that the reception control circuit 310 sends the head address of the reception control word RCW, written in the RCW head address pointer HRP, to the main storage access circuit 100 through the address line 311.

Additionally, the reception control circuit 310 extracts a head pool page pointer HPN indicative of an unused pool page number from the sent pool page control word PCW, and transfers the head pool page pointer HPN as an argument to the hash function circuit 320 through the hash argument line 321. The hash function circuit 320 calculates an entry address of a pool page number conversion table PTE based on the algorithm of the hash function, and transfers the entry address to the reception control circuit 310 through the hash signal line 322. The pool page number conversion table PTE is a conversion table for determining a real address number RPN from a pool page number PPN.

10) Step 1240 (Read PTE)

At step 1240, the reception control circuit 310 outputs the entry address of the pool page number conversion table PTE transferred thereto from the hash function circuit 320 to the main storage access circuit 100 through the address line 311. Additionally, the reception control circuit 310 outputs a requested number of bytes, based on a data length in the message header in the received message, to the main storage access circuit 100 through the byte number line 312. Further, the reception control circuit 310 outputs a main storage access request to the main storage access circuit 100 through the main storage read access line 313.

The main storage access circuit 100 reads the entry of the pool page number conversion table PTE from the main storage unit MS through the system bus SBUS based on the entry address of the pool page number conversion table PTE and the requested number of bytes sent thereto from the reception control circuit 310, and transfers the entry of the pool page number conversion table PTE to the reception control circuit 310 through the data line 315. As the entry of the pool page number conversion table PTE, for example, a real address page number A is read as a header of a reception buffer (pool page) for a pool page number 1 (pool page number PPN-1) and transferred to the reception control circuit 310.

11) Step 1250 (Calculate Real Address)

At step 1250, the reception control circuit 310 adds an in-page offset HO in the pool page control word PCW to the transferred real address page number, as the entry, to derive a real address of a reception buffer (pool page).

12) Step 1260 (Write into Reception Buffer)

At step 1260, the reception control circuit 310 sends the real address to the main storage access circuit 100 through the address line 311, sends the requested number of bytes to the main storage access circuit 100 through the byte number line 312, and sends a main storage access request to the main storage access circuit 100 through main storage write request signal line 314. Additionally, the reception control circuit 310 sends a transfer start signal to the reception buffer circuit 350 through the transfer start signal line 317, and sends the data length described in the message header to the reception buffer circuit 350 through the data length line 316.

When the transfer start signal turns on, the reception buffer circuit 350 responsively transfers message data having a length corresponding to the data length described in the message header to the main storage access circuit 100. Then, upon completion of the transfer, the reception buffer circuit 350 sends a transfer completion signal to the reception control circuit 310 through the transfer completion signal line 351.

When the main storage write request signal on the line 314 turns on, the main storage access circuit 100 responsively transfers the message data to the main storage control unit SCU through the system bus SBUS. The main storage control unit SCU writes the message data into a reception buffer on the main storage unit MS indicated by the real address sent thereto from the main storage access circuit 100.

13) Step 1270 (RCW write)

The reception control circuit 310 recognizes that a message transfer has been completed by detecting that the transfer completion signal on the line 315, from the reception buffer circuit 350, turns on. Upon completing the message transfer, the reception control circuit 310 performs operations for writing the pool page number of the reception buffer, the in-page offset, the source node number on the message header, and the port identifier into the reception control word RCW, as well as for writing a transfer completion bit indicating the reception operation has been correctly completed into the reception condition code in the reception control word RCW. For the write operations, the reception control circuit 310 sends an address calculated by adding four to the reception control word (RCW) address to the main storage access circuit 100. Additionally, the reception control circuit 310 sends a main storage access request to the main storage access circuit 100 through the main storage write access request signal line 314. Further, the reception control circuit 310 sends the pool page number, the in-page offset, the source node number on the message header, the port identifier, and the reception condition code to the main storage access circuit 100 through the data line 315.

When the main storage write request signal on the line 314 turns on, the main storage access circuit 100 responsively transfers the reception control word RCW to the main storage control unit SCU through the system bus SBUS. The main storage control circuit SCU writes the value of the reception control word RCW into the reception control word (RCW) address.

14) Step 1280 (Change PCW (Removal from RCW Chain))

At step 1280, the reception control circuit 310 turns off the validity bit Ebit, indicating whether or not the RCW head address pointer HRP in the pool page control word PCW is valid, in order to remove an associated reception control word RCW from the RCW chain. For this purpose, the reception control circuit 310 sends the address of the pool page control word PCW to the main storage access circuit 100 through the address line 311. Additionally, the reception control circuit 310 sends the requested number of bytes to the main storage access circuit 100 through the byte number line 312. Further, the reception control circuit 310 sends a main storage access request to the main storage access circuit 100 through the main storage read request line 314. In this way, the reception control circuit 310 reads the pool page control word PCW, and turns off the validity bit Ebit in the read pool page control word PCW. Subsequently, the reception control circuit 310 sends data on the pool page control word PCW to the main storage access circuit 100 through the data line 315.

Afterward, when the main storage write request on the line 314 turns on, the main storage access circuit 100 transfers the pool page control word PCW to the main storage unit SCU through the system bus SBUS.

The main storage control unit SCU writes the data on the transferred pool page control word PCW into the address of the pool page control word PCW to change the pool page control word PCW, thus removing the reception control word RCW from the chain.

15) Step 1300 (Communication Post-Processing)

The communication library reads the reception control words RCWs at regular intervals. When the communication library reads a reception control word RCW and turns on the transfer completion bit in the reception condition code in the reception control word RCW, the communication post-processing is performed. In this communication post-processing, the communication library calculates a real address on a reception buffer from a pool page number PPN and an in-page offset described in the reception control word RCW, using the algorithm of the hash function, reads data corresponding to the data length, and transfers the message to an address in a user space described in the RECV function.

According to the present embodiment, even when a plurality of processes transfer a large amount of messages each having a size of several kilobytes or less, memory management overhead is limited to a minimum in a reception process to effectively utilize the main storage unit.

Specifically, each node ND has the reception buffers POOL comprising pool pages PNPs, which are not continuous either on a logical address domain or on a real address domain, in a virtual space resident on a storage region of the main storage unit MS and used by a process executed by the node ND, and the reception buffer control information PCB located in a storage region of the main storage unit MS for managing the reception buffer POOL. A node ND, when receiving a message, calculates a real address of a reception buffer POOL in which the message is to be received, using communication information of a message header included in the received message and the reception buffer control information PCB. Therefore, since a real address region with fixed pages is not used as the reception buffer as is the case of the conventional remote memory transfer method, the memory management overhead is reduced to prevent the system performance from degrading.

In addition, according to the present embodiment, a security function can be ensured among respective processes.

Specifically, a ring buffer receiving method, one of conventional methods, has only one plane of ring control word, so that it is optimized for a system in which only one reception process is provided, such as in a communication between operation systems, where a relatively small amount of communications is performed through the ring control word. However, when inter-process communications are performed among multiple users, the security function cannot be ensured if inter-process communications occur among a plurality of processes.

In the present embodiment, on the other hand, each node ND has a port identifier at each end point of a logical communication path to make the communication path unique. Additionally, each node ND holds the reception buffer control information PCB and the reception control word RCW for each port identifier. Upon receiving a message, an entry address of a pool page number conversion table PTE is calculated based on a destination port identifier in the received message and a pool page number PPN in the reception buffer control information PCB to derive a real address page number. Then, a real address of a reception buffer for receiving the message is calculated from this real address page number and an in-page offset, so that a protection function can be held among respective processes even for process communications among a plurality of processes.

Further, according to the present embodiment, effective utilization of the storage region can be achieved.

Specifically, if the concept of the conventional ring buffer receiving method is extended, for example, to provide a plurality of planes of ring buffers so as to individually manage the ring buffers for each reception process, each reception process must reserve a fixed size area in a storage region, irrespective of the number of received messages, as a ring control word region. Therefore, when a small number of messages only are to be communicated, the reserved storage area will be mostly left unused, thus failing to achieve effective utilization of the storage region.

On the other hand, the present embodiment provides the reception control words RCWs located in a storage region of the main storage unit MS. The reception control words RCWs are provided in a chain form. Each reception control word RCW has the address of a next reception control word to be chained such that the number of reception control words RCWs can be freely increased depending on the number of received messages. Therefore, it is not necessary to reserve a fixed size area in the main storage unit MS as a region for the reception control words RCWs, thus achieving effective utilization of the storage region.

Further, according to the present embodiment, a limit to the number of received messages, which would otherwise be imposed to a reception process, can be eliminated as long as the configuration of the system allows.

Specifically, in the conventional ring buffer receiving method, the number of messages which can be received by a reception process is determined by a total number of ring control words. It is therefore difficult to communicate a large number of short messages having a size of several kilobytes among a plurality of processes.

On the other hand, the present embodiment is configured such that the reception control words RCWs are located in a storage region of the main storage unit MS, arranged in a chain form, and has the address of a next reception control word to be chain. Thus, the number of received control words RCWs in a chain can be freely increased depending on the number of received messages. It is therefore possible to communicate even a large number of short messages having a size of several kilobytes.

Next, a second embodiment of the present invention will be described with reference again to FIGS. 1, 2 and further to FIGS. 11 to 13.

In the foregoing first embodiment of the present invention, since the pool page number conversion tables PTEs are located in a storage region of the main storage unit MS, overhead occurs due to an access to the storage region for searching for an associated pool page number conversion table PTE. To eliminate this overhead, the pool page number conversion tables PTEs are cached in the second embodiment.

Figure 3:
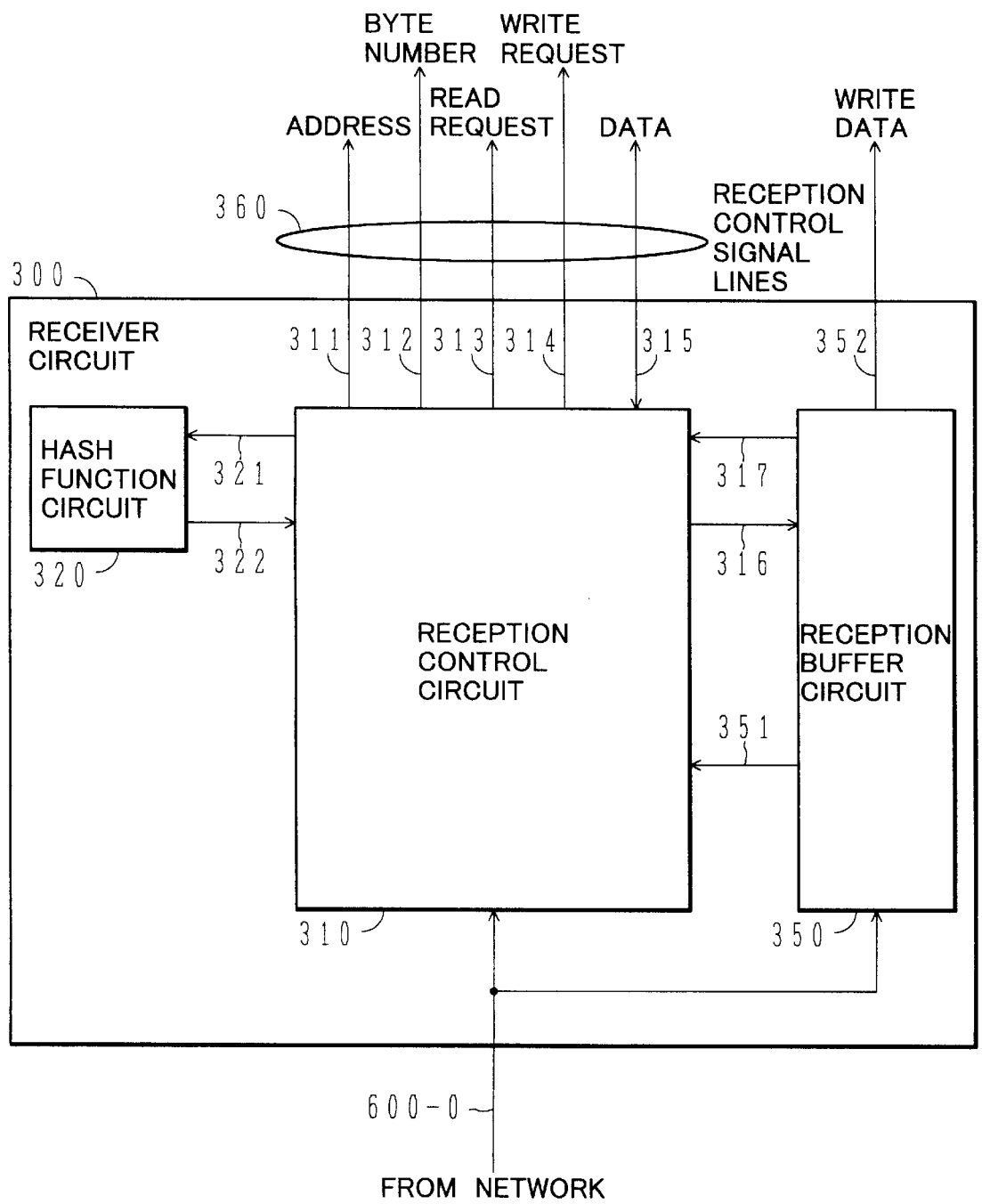
FIG. 3 is a block diagram illustrating the configuration of a receiver circuit in the network adaptor unit.
Figure 11:
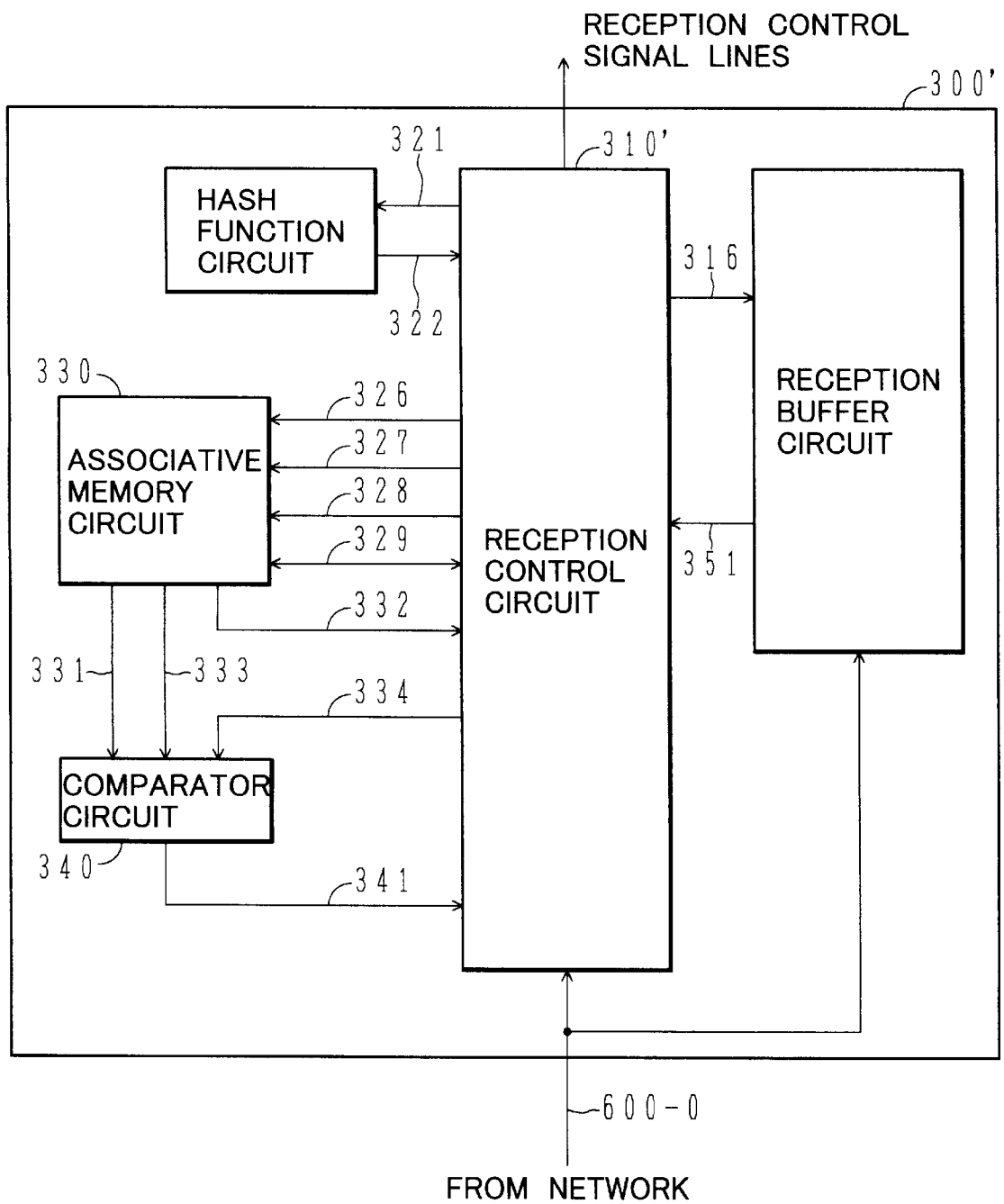
FIG. 11 is a block diagram illustrating the configuration of a receiver circuit in a network adaptor unit in a second embodiment of the present invention.
Figure 12:
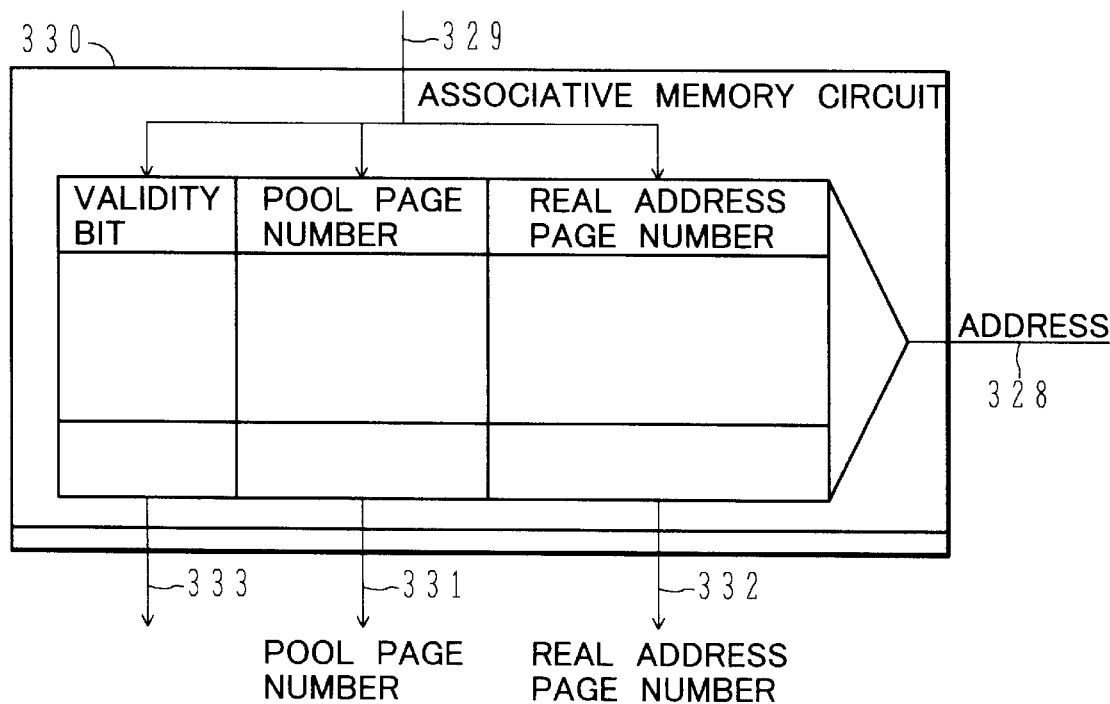
FIG. 12 is a block diagram illustrating the configuration of an associative memory circuit in the receiver circuit.

FIG. 11 illustrates the system configuration of a receiver circuit 300' in a network adaptor unit ADP in a second embodiment of the present invention, where a prime is added to reference numerals designating the receiver circuit (300') and the reception control circuit (310') to distinguish their correspondents in FIG. 3.

The receiver circuit 300', which has pool page number conversion tables PTEs cached therein, comprises the reception control circuit 310' for controlling the reception of a message; a reception buffer circuit 350 for buffering a message from a network NW; a hash function circuit 320 for generating a hash function; an associative memory circuit 330; and a comparator circuit 340.

In data received from the network NW through a reception signal line 600, a message header is transferred to the reception control circuit 310', while message data is transferred to the reception buffer circuit 350.

The reception control circuit 310' sends an argument to the hash function circuit 320 through a hash argument signal line 321. The hash function circuit 320 generates a hash signal corresponding to this argument based on the hash method, and sends the hash signal to the reception control circuit 310'.

The reception control circuit 310' is connected to an address line 311, a byte number line 312, a main storage read request signal line 313, a main storage write request line 314, and a data line 315.

The reception control circuit 310' calculates a real address of a reception buffer based on information contained in a message header. A method of calculating the real address will be described later. The reception control circuit 310' sends calculated real address data to a main storage access circuit 100 through the data line 350, sends a transfer start signal to the reception buffer circuit 350 through a transfer start signal line 317, and simultaneously sends a data length indicative of the length of data to be sent to the reception buffer circuit 350 through a data length line 316. The reception buffer circuit 350, in response to these signals, transfers stored message data to the main storage access circuit 100 through a write data line 352. The reception buffer circuit 350, when completing the transfer, sends a transfer completion signal to the reception control circuit 310' through a transfer completion signal line 351.

The configuration of the associative memory circuit 330 will be described later with reference to FIG. 12. The associative memory circuit 330 is connected to the reception control circuit 310' through a memory access control line 326, a write control line 327, an address line 328, and a data line 329. The associative memory circuit 330 is also connected to the comparator circuit 340 through a pool page number signal line 331 and a validity bit signal line 333. The associative memory circuit 330 is further connected to the reception control circuit 310' through a real address page number signal line 332. The reception control circuit 310' in turn is connected to the comparator circuit 340 through a pool page number signal line 334. Further, the comparator circuit 340 is connected to the reception control circuit 310' through a match signal line 341.

The comparator circuit 340 compares a pool page number sent thereto from the associative memory circuit 330 through the pool page number signal line 331 with a pool page number sent thereto from the reception control circuit 310' through the pool page number signal line 334, and sends a match signal to the reception control circuit 310' through the match signal line 341 when both the pool page numbers are the same and when a validity bit sent thereto from the associative memory circuit 330 through the validity bit line 333 is on. Only when the match signal is sent, a real address page number sent to the reception control circuit 310' through the real address page number signal line 332 is made valid.

Next, the configuration of the associative memory circuit 330 will be described with reference to FIG. 12.

As illustrated, the associative memory circuit 330 comprises a table listing validity bits, pool page numbers, and real address page numbers. A port identifier is inputted to the associative memory circuit 330 through the address signal line 328 as an input address. The associative memory circuit 330 outputs a pool page number through the pool page number signal line 331 in response to this input. The associative memory circuit 330 also outputs a validity bit through the validity bit signal line 333, and a real address page number through the real address page number signal line 332.

Next, a registration operation performed in the associative memory circuit 330 when a message is received will be described with reference again to FIG. 10.

Since steps 1100 through 1300 in the flow chart of FIG. 10, described in connection with the first embodiment, are identical to those of the second embodiment except for step 1240, new step 1240' substituted for step 1240 only will be described below.

10') Step 1240' (Read PTE)

At step 1240', the reception control circuit 310' turns on a memory access control signal on the line 326 to the associative memory 330 and sends a port identifier to the associative memory circuit 330 through the address line 328. After a predetermined time period, the associative memory 330 outputs a pool page number through the pool page number signal line 331, outputs a validity bit through the validity bit signal line 333, and outputs a real address page number through the real address page number signal line 332.

The comparator circuit 340 compares the pool page number, which is an output tag of the associative memory circuit 330, inputted thereto through the pool page number signal line 331 with a pool page number inputted thereto through the pool page number signal line 334, and checks the validity bit inputted thereto through the validity bit signal line 333. In this event, since the validity bit is off in an initial access operation, the match signal outputted from the match signal line 341 of the comparator circuit 340 does not turn on.

To cope with this case, the reception control circuit 310' outputs an entry address of a pool page number conversion table PTE transferred from the hash function circuit 320 to the main storage access circuit 100 through the address line 311. The reception control circuit 310' also outputs a requested number of bytes to the main storage access circuit 100 through the byte number line 312 based on a data length in the message header in the received message. Further, the reception control circuit 310' outputs a main storage access request to the main storage access circuit 100 through the main storage read request signal line 313.

The main storage access circuit 100 reads the entry of the pool page number conversion table PTE from the main storage unit MS through the system bus SBUS based on the entry address of the pool page number conversion table PTE and the required number of bytes sent thereto from the reception control circuit 310', and transfers the entry of the pool page number conversion table PTE to the reception control circuit 310' through the data line 315. As the entry of the pool page number conversion table PTE, for example, a real address page number A is read as a header of a reception buffer (a pool page) for a pool page number 1 (PPN-1), and transferred to the reception control circuit 310'.

The reception control circuit 310' further transfers the transferred entry of the pool page number conversion table PTE to the associative memory circuit 330. Specifically, the reception control circuit 310' turns on the memory access control signal on the line 326 and a write control signal on the line 327, sends a port identifier to the associative memory circuit 330 through the address line 328, and sends a pool page number and a real address page number to the associative memory circuit 330 through the data line 329. As a result, the pool page number and the real address page number can be registered in the associative memory circuit 330 at the address indicated by the port identifier. Once the registration of the pool page number and the real address page number has been completed, when a received message requires an access to the entry of this pool page number, the associative memory circuit 330 may be utilized to omit an access to the main storage unit MS, thus making it possible to eliminate the overhead due to the access to the main storage unit MS for reading the pool page number conversion table PTE.

Next, a method of invalidating a pool page number conversion table, registered as described above, will be described with reference to FIG. 13.

Figure 13:
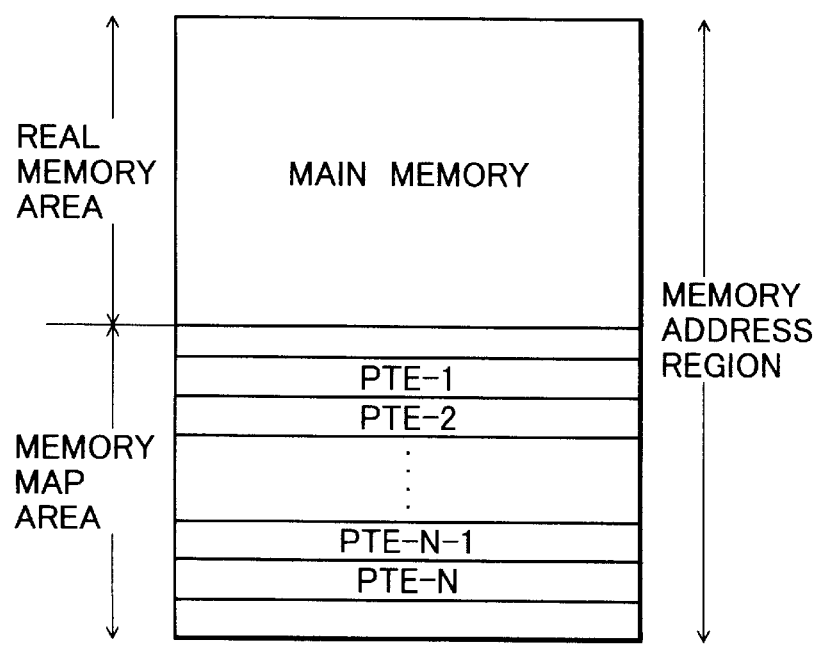
FIG. 13 is a memory map diagram showing the structure of a particular address region in a main storage unit.

FIG. 13 illustrates the structure of a memory address region extending over a particular range on the main storage region in the second embodiment of the present invention.

The main address region comprises a real memory area used as a main memory and a memory map area in which entries PTE-1, PTE-2, . . . , PTE-N are located for corresponding pool page number conversion tables PTEs.

Entries of pool page number conversion tables PTEs registered in the associative memory circuit 330 in the network adaptor unit ADP can be invalidated by issuing a store instruction to addresses associated with these entries.

An instruction processing unit IP issues a store instruction to the main storage control unit SCU. The main storage control unit SCU decodes addresses encoded in the store instruction. The main storage control unit SCU, when recognizing that the decoded addresses include an entry address of a pool page number conversion table PTE mapped in the memory map area, issues a store instruction to the network adaptor unit ADP through the system bus SBUS to transfer the addresses and store data.

The network adaptor unit ADP sets the transferred addresses in a reception address register in the main storage access circuit 100 and sets the transferred store data in a reception control information register. The contents of the reception address register and the reception control information register are transferred to the reception control circuit 310' in the receiver circuit 300.

The reception control circuit 310' turns the memory access control signal on the line 326, and outputs an address associated with a port identifier from among the transferred addresses to the associative memory circuit 330 through the address line 328 to read data comprising a validity bit, a pool page number, and a real address page number from the associative memory circuit 330 through the data line 329. Subsequently, the reception control circuit 310' turns on the memory access control signal on the line 326 and the write control signal on the line 327, and outputs the port identifier to the associative memory circuit 330 through the address line 328 to send the read data to the associative memory circuit 330 through the data line 329. In this event, the validity bit is set to zero, while the pool page number and the real address page number remain unchanged. In this way, a particular entry in the associative memory circuit 330 is invalidated.

In addition, the pool page number conversion table PTE on the main storage unit MS, associated with the invalidated entry in the associative memory circuit 330, must be also invalidated. This may be achieved by turning off the validity bit associated with the entry of the pool page number conversion table PTE.

According to the present embodiment, even if a plurality of processes transfer a large amount of messages having a size of several kilobytes or less, memory management overhead can be minimized in a reception process to effectively utilize the storage region.

Also, a security function can be ensured among respective processes.

Further, a limit to the number of received messages, imposed to a reception process, can be eliminated as long as the configuration of the system allows.

Furthermore, according to the present embodiment, it is possible to eliminate overhead which would occur due to an access to the main storage unit when a message is received.

Specifically, if reception control information is located in the main storage unit, overhead occurs due to an access to the main storage unit when a message is received, thus causing degradation in reception performance of the hardware. The present embodiment, in turn, provides the associative memory circuit which outputs a real address page number based on a pool page number and communication information included in a received message, inputted thereto as keys, in the network adaptor unit connected to the main storage unit through the system bus for once receiving a message from the network. The associative memory circuit can be utilized to retrieve a real address number corresponding to a pool page number when a message is received, thus making it possible to eliminate the overhead due to an access to the main storage unit which would otherwise be required for retrieving the reception control information for the received message.

According to the present invention as described above, in a message reception method, even if a plurality of processes transfer a large amount of messages each having a size of several kilobytes or less, memory management overhead can be reduced to a minimum in a reception process to effectively utilize a memory or a storage unit.

What is claimed is:

1. A parallel processor system comprising a plurality of nodes and a network for interconnecting said plurality of nodes, each of said nodes including a processor and a main storage unit, wherein a user process is executed in each of said nodes under the control of an operating system, and inter-process communications are performed among said respective nodes through said network to transmit and receive messages, each of said nodes comprising:

reception buffers provided in a main storage region of said main storage unit, said reception buffers addressed by pool pages in a virtual space used by said user process executed in said node, said pool pages being discontinuous on a logical address domain or on a real address domain; and reception buffer control information located in said main storage region for managing said reception buffers, wherein a node receiving a message uses communication information and said reception buffer control information included in the received message to calculate a real address of a region in which the received message is to be stored in said reception buffers.

2. A parallel processor system according to claim 1, wherein:

each of said nodes further comprises a plurality of reception control words provided in said main storage region, said each reception control words including information on an address in said reception buffers in which a received message is stored, and said plurality of reception control words are arranged in a chain form, each of said reception control words having an address of a next reception control word to be chained.

3. A parallel processor system according to claim 2, wherein:

each of said nodes further comprises a network adaptor connected to said main storage unit through a system bus for transmitting and receiving a message to and from said network, said reception buffers are addressed by a pool page number and an in-page offset, said pool page number being independent of a logical address page number and a real address page number, said reception buffer control information includes a pool page control word for controlling said reception buffers using said pool page number and a pool page number conversion table indicative of a correspondence between the pool page number and the real address page number, and said network adaptor, when receiving a message, reads said pool page control word based on said communication information included in said received message, retrieves said pool page number and said in-page offset from said pool page control word, calculates an entry address of said pool page number conversion table based on said retrieved pool page number, reads a real address page number corresponding to said retrieved pool page number from said pool page number conversion table using said entry address, and calculates a real address in said reception buffers for storing said received message from said real address page number and said in-page offset.

4. A parallel processor system according to claim 3, wherein:

said pool page control word includes an address value of a reception control word in said plurality of reception control words arranged in a chain form, and said network adaptor, when receiving a message, retrieves the address value of said reception control word from said pool page control word, writes said pool page number on said reception buffers in which said received message is stored and said in-page offset into said reception control word, and changes the address value of said reception control word in said pool page control word to an address value of another reception control word chained to said reception control word.

5. A parallel processor system according to claim 3, wherein:

at least one port identifier is assigned to each of said nodes, said at least one port identifier is each provided with said reception buffer control information and said plurality of reception control words, and said network adaptor, when receiving a message, reads said pool page control word in one of said reception buffer control information corresponding to a destination port identifier included in said received message, and retrieves said pool page number and said in-page offset from said pool page control word.

6. A parallel processor system according to claim 3, wherein:

said network adaptor further comprises an associative memory for outputting a real address page number corresponding to said pool page number based on said communication information included in said received message, said network adaptor, when receiving a message, retrieves a real address number corresponding to said pool page number using said associative memory, and when an associated pool page number is not registered in said associative memory, said real address page number corresponding to said pool page number is read from said pool page number conversion table, and said pool page number and said read real address page number are registered in said associative memory.

7. A parallel processor system according to claim 4, wherein:

upon completing storage of said received message in said reception buffers, said processor for executing a user process in said node reads said received message from said reception buffers, and transfers said received message to a region in a main storage unit allocated in a virtual space used by said user process.

8. A parallel processor system according to claim 3, wherein:
said network adaptor includes a receiver circuit for receiving a message from said network, said receiver circuit comprising:
a buffer circuit for temporarily holding a received message and transferring said received message to said reception buffers; and
a reception control circuit for reading said pool page control word based on said communication information included in said received message, retrieving said pool page number and said in-page offset from said pool page control word, calculating an entry address of said pool page number conversion table based on said retrieved pool page number, reading a real address page number corresponding to said retrieved pool page number from said pool page number conversion table using said entry address, and calculating a real address on said reception buffers for storing said received message from said real address page number and said in-page offset.

9. A parallel processor system according to claim 8, wherein:
said receiver circuit further comprises a hash function circuit which receives said pool page number from said reception control circuit for calculating an entry address of said pool page number conversion table in accordance with a hash function with said pool page number used as an argument.

10. A message receiving method for a parallel processor system comprising a plurality of nodes and a network for interconnecting said plurality of nodes, each of said nodes including a processor, a main storage unit, and a network adaptor connected to said main storage unit through a system bus for transmitting and receiving a message to and from said network, wherein a user process is executed in each of said nodes under the control of an operating system to perform inter-process communications among said respective nodes through said network to transmit and receive messages, said method comprising the steps of:
providing reception buffers in a main storage region of said main storage unit in each of said node, said reception buffers being addressed by pool pages, said pool pages being discontinuous on a logical address domain or on a real address domain in a virtual space used by said user process executed in each of said nodes;
generating reception buffer control information for managing said reception buffers in said main storage region; and
upon receiving a message, calculating a real address of a region for storing said received message in said reception buffers using communication information and said reception buffer control information included in said received message.

11. A message receiving method according to claim 10, further comprising the steps of:
generating a plurality of reception control words including information on the address on said reception buffers for storing said received message in said main storage region;
writing an address of a next reception control word to be chained into each of said reception control words; and
arranging said plurality of reception control words in a chain form.

12. A message receiving method according to claim 11, wherein:
said step of providing reception buffers further includes the step of previously addressing said reception buffers by a pool page number and an in-page offset, said pool page number being independent of a logical address page number and a real address page number, and
said step of generating reception buffer control information further includes the steps of:
generating pool page control words for controlling said reception buffers using said pool page number and a pool page number conversion table for indicating a correspondence between a pool page number and a real address page number;
upon receiving a message, reading one from said pool page control words based on said communication information included in said received message;
retrieving said pool page number and said in-page offset from said pool page control word;
calculating an entry address of said pool page number conversion table based on said retrieved pool page number;
reading a real address page number corresponding to said retrieved pool page number from said pool page number conversion table using said entry address; and
calculating a real address on said reception buffers for storing said received message from said real address page number and said in-page offset.

13. A message receiving method according to claim 12, wherein:
said step of calculating an entry address includes the step of calculating the entry address of said pool page number conversion table in accordance with a hash function with said retrieved pool page number used as an argument.

14. A message receiving method according to claim 12, wherein:
said step of generating pool page control words further includes the steps of:
writing an address value of a reception control word in said plurality of reception control words arranged in a chain form into said pool page control word;
upon receiving a message, retrieving the address value of said reception control word from said pool page control word;
writing said pool page number and said in-page offset on said reception buffers in which said received message is stored into said reception control word; and
changing the address value of said reception control word in said pool page control word to an address value of another reception control word chained in said reception control words.

15. A message receiving method according to claim 12, wherein:
at least one port identifier is allocated each of said nodes, and
said step of generating reception buffer control information includes the steps of:
generating said reception buffer control information for each said at least one port identifier;
upon receiving a message, reading said pool page control word in one of said reception buffer control information corresponding to a destination port identifier included in said received message; and retrieving said pool page number and said in-page offset from said pool page control word.

16. A message receiving method according to claim 12, wherein said network adaptor further comprises an associative memory for outputting a real address page number corresponding to said pool page number based on said pool page number and communication information included in said received message, and said method further comprises the steps of:

upon receiving a message, retrieving a real address page number corresponding to said pool page number using said associative memory;

reading a real address page number corresponding to said pool page number from said pool page number conversion table when said pool page number is not registered in said associative memory; and registering said pool page number and said read real address page number in said associative memory.

17. A message receiving method according to claim 14, further comprising the step of:

upon completing storage of said received message in said reception buffers, reading said received message from said reception buffers, and transferring said received message to a region in said main storage unit allocated to a virtual space used by said user process.

\* \* \* \* \*